United States Patent [19]

Houghton

[11] 4,197,043
[45] Apr. 8, 1980

[54] SLAB MILLING MACHINE

[75] Inventor: Geoffrey Houghton, Wimbourne, England

[73] Assignee: Loewy Robertson Engineering Company Limited, Dorset, England

[21] Appl. No.: 917,665

[22] Filed: Jun. 21, 1978

[30] Foreign Application Priority Data

Jun. 28, 1977 [GB] United Kingdom ............... 27018/77

[51] Int. Cl.² .............................................. B23C 3/14
[52] U.S. Cl. ..................................... 409/139; 409/138
[58] Field of Search ........................... 51/80 A, 165.77; 90/11 R; 409/133, 138, 139

[56] References Cited

U.S. PATENT DOCUMENTS

| | | | |
|---|---|---|---|
| 2,142,736 | 1/1939 | Rougemont | 409/139 X |
| 3,618,462 | 11/1971 | Eibe et al. | 90/11 R |
| 3,676,959 | 7/1972 | Foster | 409/139 X |
| 3,765,621 | 6/1976 | Grieb et al. | 51/165.77 |
| 3,918,348 | 11/1975 | Runft | 90/11 R |
| 4,046,180 | 9/1977 | Marshall et al. | 409/138 X |
| 4,047,470 | 9/1977 | Lorenz | 90/11 R X |
| 4,077,448 | 3/1978 | Hasenwinkle | 409/138 X |
| 4,119,015 | 10/1978 | Tuda | 51/80 A |

FOREIGN PATENT DOCUMENTS

| | | | |
|---|---|---|---|
| 1603853 | 6/1971 | France | 409/139 |
| 1217371 | 12/1970 | United Kingdom | 90/11 R |
| 1414281 | 11/1975 | United Kingdom | 409/139 |
| 1458346 | 12/1976 | United Kingdom | 409/139 |
| 456709 | 5/1975 | U.S.S.R. | 409/139 |

*Primary Examiner*—William R. Briggs
*Attorney, Agent, or Firm*—Lee & Smith

[57] ABSTRACT

A milling machine for milling a face of a metal workpiece has a cutter positioned to act on the face of a workpiece passed through the machine. A control means is employed to ensure that the depth of cut on the face remains at its preset value regardless of variations in thickness of the workpiece entering the machine.

In a preferred arrangement, the machine has a pair of cutters positioned to act on opposed faces of the workpiece. The control means then ensures that the depth of cut on each face remains at its preset value.

This is different from known machines in which the cutters are arranged to cut the faces so that the outgoing thickness of the workpiece remains the same regardless of variations in thickness of the workpiece entering the machine.

10 Claims, 4 Drawing Figures

SLAB MILLING MACHINE

This invention relates to milling machines and in particular to milling machines which are used to mill at least one of a pair of opposite faces of an elongate metal workpiece such as a slab.

Particularly in the manufacture of copper workpieces, it is necessary to mill a pair of opposed faces thereof in order to remove scale and the like from the faces prior to the workpiece being rolled in a rolling mill. If this impurity is not removed, it will be rolled into the workpiece during the subsequent rolling operations and this is detrimental to the quality of the workpiece.

In such machines it is usual for the workpiece to be fed between a cutter and an associated support member which may be a so-called back-up roller or a flat slide plate. The cutter acts on one face of the workpiece and the cutter gap, i.e. the gap between the cutter and its associated support member, determines the thickness of the workpiece after it has been acted upon by the cutter. It is necessary to machine the pair of opposed faces of the workpiece and, after the workpiece has been machined on one face, it is either fed to a second similar machine for treatment of the second face or it is inverted and fed through the same machine again after the cutter has been adjusted to mill the required amount of material from the second face.

The milling machine may have a pair of cutters offset in the direction of movement of the workpiece through the machine with each cutter having its associated support member and in this way both of the opposite faces of the workpiece are milled during one pass of the workpiece through the machine.

The cutters may be of cylindrical form with the cutting edges on their periphery, or they may be so-called face-milling cutters which operate with their axes at right angles to the face of the workpiece which is being milled. Alternatively they may be in the form of planar blades caused to move across the face of the workpiece.

When the cutters are of cylindrical form, a pair of them may be arranged in opposed relation and in this way each cutter also acts as the support member for the other cutter so that back-up rollers or the like are not required. The gap between the two cutters determines the thickness of the workpiece.

It has been common practice with these milling machines to set the gap between the cutters or between each cutter and its co-operating support member to ensure that both faces of the workpiece are machined to produce a workpiece of a substantially constant thickness. Such operation of the machine is satisfactory so long as the thickness of the workpiece entering the milling machine does not vary. If the thickness does vary, and, for example, the thickness increases, then the amount of material actually removed from the face also increases to produce a workpiece of constant thickness. With such an arrangement, the amount which is removed from the face of the workpiece is far more than is necessary and is wasteful of material. If, however, the thickness of the workpiece decreases, then it sometimes occurs that all of the scale is not removed from the faces of the workpiece and this results in an unsatisfactory product after rolling.

Furthermore, variations in depth of cut cause more rapid wear on the cutter teeth than will be the case if the depth of cut was maintained at a constant value.

It is an object of the present invention to provide a milling machine having control means by which these difficulties are substantially overcome.

According to a first aspect of the present invention, a milling machine comprises means for guiding an elongate metal workpiece in the direction of its length along a path, a cutter positioned on one side of the path and a cooperating support member positioned on the other side of the path, the cutter being arranged to act on a face of an elongate workpiece guided along the path, the cutter and the support member together defining a cutter gap and means for adjusting said cutter gap, characterised in that means are provided for producing an electrical signal representative of the thickness of the workpiece upstream of the cutter gap, and control means responsive to said electrical signal serve to bring about adjustment of the cutter gap to produce a required depth of cut on the said face of the workpiece irrespective of variations in the thickness of the workpiece upstream of the cutter gap.

According to a second aspect of the invention, a milling machine comprises means for guiding an elongate metal workpiece in the direction of its length along a path, a pair of cutters positioned on opposite sides of the path and arranged to act on respective opposed faces of an elongate workpiece guided along the path, characterised in that each cutter has means associated therewith for producing an electrical signal representative of the thickness of the workpiece after it has been acted upon by the cutter, means are provided for producing an electrical signal representative of the thickness of the workpiece upstream of the cutters and control means which are responsive to said electrical signals and serve to bring about relative positional movement between the cutters and said faces to produce a required depth of cut on each face irrespective of variations in the thickness of the workpiece.

In a milling machine having a pair of cutters, the operator sets into the machine information concerning the depth of cut required on each of the opposed faces and the control means automatically sets the cutters so as to produce said depth of cut on the opposed faces. If the thickness of the workpiece entering the milling machine varies, then the control means adjusts the relative position between the cutters and the faces to bring about the required depth of cut irrespective of the variations in the thickness of the workpiece entering the milling machine.

In view of the fact that variations in the thickness of the workpiece entering the milling machine ususally occur relatively slowly, it is not necessary to have continual adjustment of the cutters and in one embodiment of the invention, the thickness of the workpiece entering the milling machine is measured at regular time intervals and an electrical signal representative of the thickness of the workpiece is retained until the next measurement is taken.

In order that the invention may be more readily understood it will now be described, by way of example only, with reference to the accompanying drawings, in which.

Figure 1:
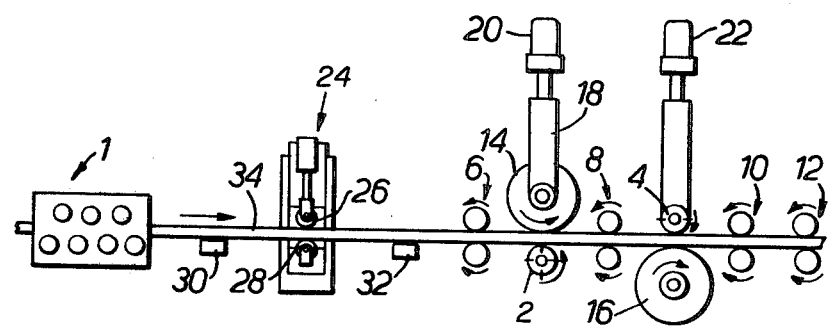
FIG. 1 is a diagrammatic side elevation of a milling machine.

Referring to FIG. 1, a milling machine for milling elongate metal workpieces in the form of slabs has a conventional roller flattening machine 1 provided at its entry end. A pair of rotary cutters 2, 4 are located on opposite sides of a path extending through the milling machine. Pairs of driven pinch rolls 6, 8, 10 and 12 are positioned along said path to guide a workpiece entering the mill from the flattener 1 along the path so that its upper and lower faces can be acted upon by the respective rotary cutters. The cutter 2 has a back-up roller 14 positioned above the path and the cutter 4 has a back-up roller 16 positioned below the path.

The cutter 2 and its back-up roller 14 form part of a first milling assembly 18 which includes means for raising and lowering the roller 14 with respect to the cutter 2 which is fixed relative to the path. The vertical position of the roller 14 with respect to the path is adjusted by means of a positioning device 20 acting on the bearing chocks of the roller 14. A transducer (not shown) is located between the bearing chocks of the cutter 2 and the roller 14 to provide an electrical signal representative of the gap between the cutter and the roller and which is representative of the thickness of the workpiece after it has been acted upon by the cutter 2.

The cutter 4 is displaceable towards and away from the path while the back-up roller 16 is fixed relative to the path. The vertical position of the cutter 4 is adjustable by means of a positioning device 22 which acts upon the bearing chocks of the cutter 4. A transducer (not shown) is located between the bearing chocks of the cutter 4 and the roller 16 to provide an electrical signal indicative of the gap between the cutter and the roller and representative of the thickness of the workpiece after it has been acted upon by the cutter 4.

Between the flattener 1 and the cutter 2 there is a device 24 for measuring the thickness of the workpiece before it is acted upon by the cutters. The device consists of a pair of rolls 26, 28 on opposite faces of the workpiece and a transducer which indicates the separation of the rolls. The device is shown in more detail in FIG. 2.

A metal detector 30 is located below the path between the flattener 1 and the thickness measuring device 24. A further metal detector 32 is located between the thickness measuring device 24 and the first pair of pinch rolls 6. Each of the metal detectors provides an electrical signal when a metal workpiece is present on the path immediately above it.

Initially the metal workpiece is brought into position between the measuring rolls of the device 24 so that the rolls engage opposed faces of the workpiece and the transducer associated with the device produces an electrical signal representative of the thickness of the workpiece between the rollers. The desired depth of cut on each of the opposed faces of the workpiece is determined by the operator and the control means causes the gaps between the two cutters and their respective back-up rollers to be adjusted in order to give a required depth of cut on each of the faces. The pairs of pinch rolls 6, 8, 10 and 12 feed the workpiece 34 through the milling machine and the required cuts are made on the opposed faces.

Figure 2:
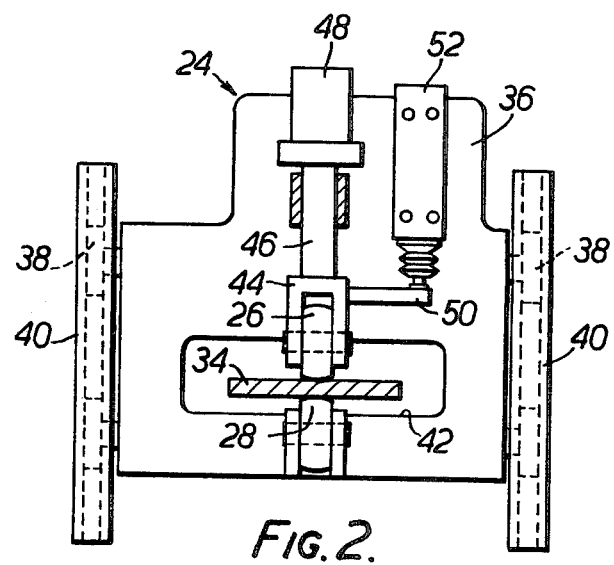
FIG. 2 is a sectional elevation of a workpiece thickness measuring device shown in FIG. 1.

Referring now to FIG. 2, the thickness measuring device 24 is shown in more detail. The device comprises a light-weight frame 36 which is guided at a pair of opposite sides by means of rollers 38 acting in vertical channel members 40. The frame is thus free to move vertically with respect to the channel members. The frame 36 has an opening 42 extending through it which is dimensioned such as to permit the workpiece 34 to pass through it. The underside of the workpiece is contacted by the roller 28 which is mounted on the frame while the upperside of the workpiece can be contacted by the roller 26 which is mounted in a housing 44 secured to the lower end of a connecting rod 46, the upper end of which is connected to a piston of a fluid cylinder 48. The fluid cylinder serves to bias the roller 26 into engagement with the upper surface of the workpiece 34 but the roller can be displaced upwardly if the thickness of the workpiece increases.

The frame 44 has an outwardly extending arm 50 to which one end of a position transducer 52 is connected. The transducer is mounted on the frame 36. As the roller 26 moves vertically, due to the variation in the thickness of the workpiece, the transducer 52 is actuated and it produces an electrical signal which is representative of the thickness of the workpiece between the rollers 26 and 28.

Figure 3A:
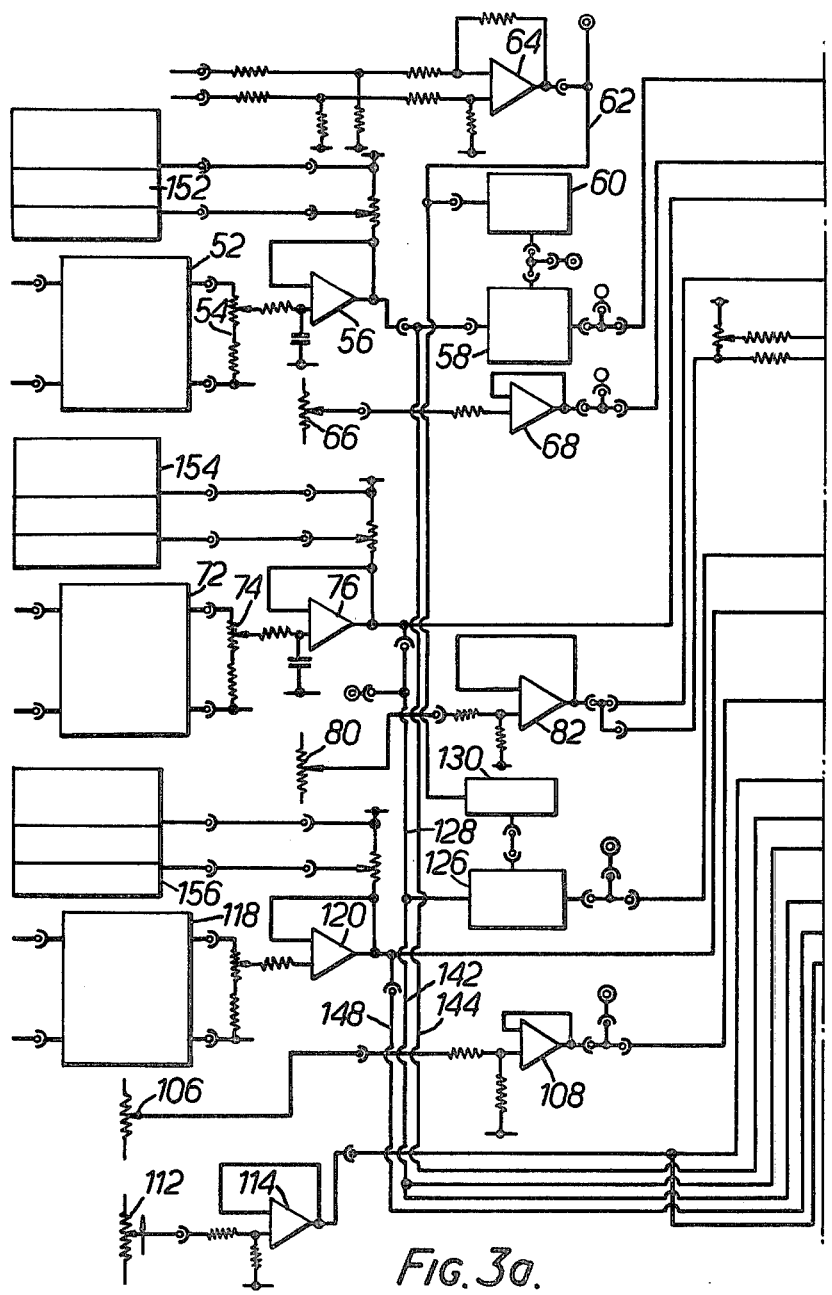
FIG. 3 is a circuit diagram of control means for the milling machine.
Figure 3B:
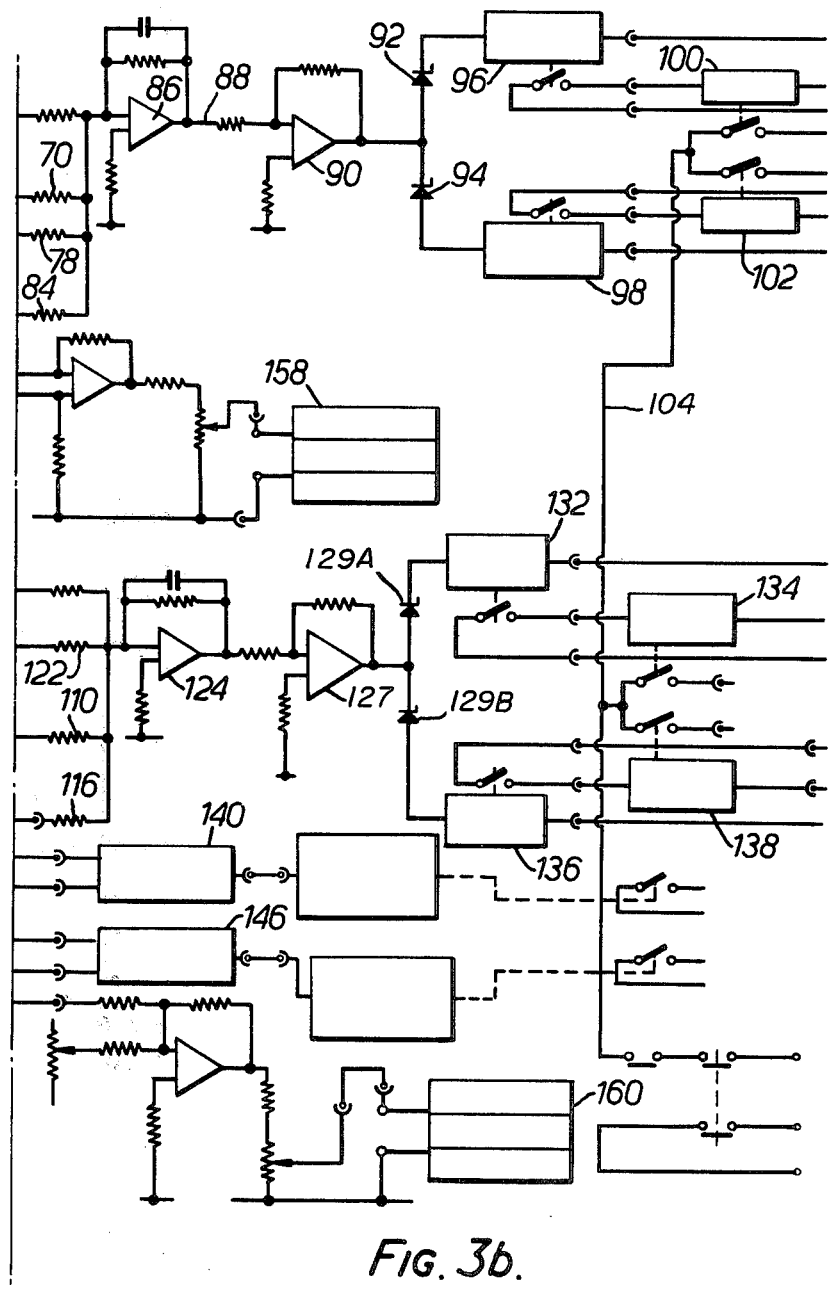

Referring now to FIG. 3, the transducer 52 associated with the thickness measuring device for the incoming workpiece is shown connected with its output across a potentiometer 54. An output from the movable contact on the potentiometer is taken through a buffer amplifier 56 and fed to a sample and hold amplifier 58. Amplifier 58 receives regular signals from a timer control 60 which in turn receives a signal dependent on the speed of the workpiece as it passes through the machine. This signal is received on line 62 from a buffer amplifier 64 which receives a signal from a device (not shown) and which is responsive to the speed of the movement of the workpiece along the path. When the sample and hold amplifier receives a signal from the timer 60, it measures the output from the buffer amplifier 56 and retains that measurement until the next signal is received from the timer 60, at which time it receives a further signal from the buffer 56.

On the control desk for the machine, there is a potentiometer 66 on which the operator sets the required depth of cut for the first cutter. A typical depth of cut may be up to 0.030 inches. The output from the potentiometer is applied through a buffer amplifier 68 to a resistor 70. The cutter 2 has a transducer associated with it which indicates the separation between the cutter 2 and its back-up roller 14, FIG. 1. This transducer is indicated by reference numeral 72. The output from this transducer is applied to a potentiometer 74 and the output from the potentiometer is connected through a buffer amplifier 76 and applied across a resistor 78.

When the cutter 2 has been in use for some time, it is necessary to regrind it and this brings about a slight reduction in the diameter of the cutter. To allow for this, a potentiometer 80 allows a signal representative of the reduction in the size of the cutter to be applied through a buffer amplifier 82 and across a resistor 84. The signals applied across the resistors 84, 78 and 70 are added together and are applied as an input to a summing amplifier 86 which also receives a signal of the opposite polarity from the sample and hold amplifier 58. The addition signal from the resistors 70, 78 and 84 is compared in the amplifier 86 with the signal from the sample and hold amplifier and a difference or error signal is provided on line 88. The error signal on line 88 passes to a dual comparator comprising a buffer amplifier 90 and two oppositely poled zener diodes 92, 94. Diode 92 is connected in series with a reed relay 96 and diode 94 is connected in series with reed relay 98. The contact of relay 96 is connected in series with the coil of a further relay 100 and the contact of this relay is connected in a drive circuit for the back-up roller of the first cutter such as, when energised, to open up the gap between the back-up roller and its cutter. The contact of relay 98 is connected in series with a further relay 102 and the contact of this relay is connected in series with the drive circuit for the back-up roller of the first cutter such that, when the contact is closed, the back-up roller is moved towards the cutter to reduce the distance between them. The drive for the back-up roller is supplied with a drive signal on line 104. If the error signal from the amplifier 86 is such as to indicate that the gap between the cutter and its back-up roller is too great, by an amount which causes zener diode 94 to break down, then relay 102 is actuated and the back-up roller is displaced towards the cutter until the error signal is reduced to zero. Similarly, if the polarity of the signal from the amplifier 86 is such as to show that the gap between the cutter and its back-up roller is too small, by an amount which causes the zener diode 92 to break down, then relay 100 is actuated causing the back-up roller to move towards the cutter until the error signal is zero.

On the operator's control desk there is also a rheostat 106 on which the operator can set a required depth of cut for cutter 4 typically up to 0.030 inches. The signal from this rheostat is applied through a buffer amplifier 108 to be applied across a resistor 110. There is also a rheostat 112 on which any variation in the cutter diameter can be set and this signal is applied through a buffer amplifier 114 across a resistor 116. The transducer associated with the cutter 4 is indicated by reference numeral 118 and the output from the transducer is connected through a buffer 120 and dropped across a resistor 122. The signals across the resistors 110, 116 and 122 are added together to form an addition signal and in a summing amplifier 124 they are compared with a signal from a sample and hold amplifier 126 which receives an output from the buffer amplifier 76 on a line 128. The sample and hold amplifier is operated intermittently by way of a timer 130 which receives an electrical signal on the line 62. The output from the sample and hold amplifier 126 is compared with the addition signal to form an error signal as an output from the summing amplifier 124. The timer 130 provides regular signals to the sample and hold amplifier so that the amplifier receives a signal from the line 128 and holds that signal until the next signal is received from the timer whereupon the amplifier receives the signal on the line 128 and holds this until the next signal from the timer 130 is received.

The output from summing amplifier 124 is applied to a dual comparator consisting of a buffer amplifier 127 and two zener diodes 129A, 129B arranged in opposed relation. The output from the diode 129A is applied to a reed relay 132, the contact of which is connected in series with a further relay 134. The output from the diode 129B is connected to a relay 136 having a contact in series with a further relay 138. If the output from the buffer 126 is sufficiently large to cause breakdown of one or other of the diodes, the appropriate relay is operated in order to cause the cutter 4 to be moved up or down depending upon the polarity of the error signal. If the error signal indicates that the separation of the cutter and its back-up roller is too low, then the cutter 4 is caused to be raised until the error signal is reduced to zero. Similarly, if the polarity of the error signal is such as to indicate that the cutter and its back-up roller are separated by too great an amount, then the appropriate relay is operated to cause the actuating device to drive the cutter towards its back-up roller until the error signal is zero.

The signal on line 104, which brings about the adjustment of the cutters or their back-up rollers, is supplied from a source through contacts associated with the metal detectors 30, 32 respectively. In this way the cutters and their back-up rollers cannot be actuated until metal is passing through the metal detectors.

As a further precaution, a comparator 140 receives two signals from lines 142 and 144 respectively which are the outputs from the buffers 76 and 56 respectively. If these signals indicate that the first cutter 2 has to make a depth of cut of greater than 0.030 inches, then the comparator operates a relay which de-energises the roller flattening machine and the pinch rolls 6, 8, 10 and 12 to render the machine inoperative. Similarly, a comparator 146 receives signals on line 142 and 148, the latter being received from the buffer 120, and again if the comparator 146 indicates that the cutter 4 has to make a depth of cut greater than 0.030 inches, then a relay is operated to render the pinch rolls 6, 8, 10 and 12 inoperative along with the roller flattening machine.

The first transducer 52 has a digital display device 152 associated with it to indicate the in-going thickness of the workpiece and the transducers 72 and 118 have digital displays 154 and 156 respectively which indicate the thickness of the material as it passes between the first and second cutters respectively. The actual diameters of the cutters 2 and 4 are indicated on digital displays 158 and 160 respectively.

The control circuit of the invention enables the depth of cut on each of the cutters to be selected by the operator and for this depth of cut to be made on the appropriate face of the workpiece. If the in-going thickness of the workpiece changes, then the depth of cut remains the same and this results in a product having the required depth of cut on each of its opposite faces regardless of variation in in-going thickness. The sample and hold amplifiers 58 and 126 operate intermittently and changes in the separation of the cutters and their associated back-up rollers are made intermittently but this is satisfactory since changes in the thickness of the workpiece occur at long term intervals. If the incoming material has large gauge variations at irregular intervals, the sample and hold circuits would be replaced by analogue delay circuits. This system would allow gauge signals to be delayed according to the line speed, so that the cutter gap variation between 2 and 14 would follow the gauge variations measured at 24 but delayed by a precise period. A similar delay would operate at the second cutter and backup rollers 4 and 16 but would take its gauge reference from the transducer at the first cutter position. It is not necessary for the same depth of cut to be made on each face of the workpiece, the operator has the choice of setting different depths of cut for the opposite faces, if he so wishes.

I claim:
1. A milling machine comprising
   (a) means for guiding an elongate metal workpiece in the direction of its length along a path,
   (b) a cutter positioned on one side of the path and a co-operating support member positioned on the other side of the path, the cutter being arranged to produce a cut on a face of an elongate workpiece guided along the path, the cutter and the support member together defining a cutter gap,

(c) means for adjusting the cutter gap, (d) means for providing an electrical signal representative of the thickness of the workpiece upstream of the cutter gap, (e) means for providing an electrical signal representative of the cutter gap, (f) means for providing an electrical signal representative of the desired depth of cut on said face of the workpiece, (g) means arranged to receive said electrical signals and to produce an error signal representative of the difference between the desired and actual depth of cut on said face, and, (h) means responsive to said error signal to operate the cutter gap adjusting means in the sense to reduce said error signal substantially to zero to thereby produce the desired depth of cut on the face of the workpiece irrespective of variations in the thickness of the workpiece upstream of the cutter gap.

2. A milling machine as claimed in claim 1, wherein the cutter and its support member have transducer means associated therewith for producing said electrical signal representative of the cutter gap and a summing device is employed to add said signal to said signal representative of the desired depth of cut and to compare said addition signal with said signal representative of the thickness of the workpiece upstream of the cutter gap to produce said error signal.

3. A milling machine comprising (a) means for guiding an elongate metal workpiece in the direction of its length along a path, (b) a pair of cutters positioned on opposite sides of the path and arranged to produce a cut on respective opposed faces of an elongate workpiece guided along the path, (c) means for adjusting the position of each of said cutters relative to said respective face of the workpiece, (d) means for providing an electrical signal representative of the thickness of the workpiece upstream of both cutters, (e) each cutter having means associated therewith for producing an electrical signal representative of the thickness of the workpiece after it has been acted upon by the cutter, (f) means for providing electrical signals representative of the desired depth of cut on each of said faces of the workpiece, (g) the cutter which is first encountered by the workpiece as it passes along the path having means arranged to receive the electrical signal representative of the desired depth of cut by that cutter, the electrical signal representative of the thickness of the workpiece after it has been acted upon by the cutter, and the signal representative of the thickness of the workpiece upstream of both cutters and to produce a first error signal representative of the difference between the desired and actual depth of cut, (h) means responsive to said first error signal to operate said cutter positioning means in the sense to reduce said first error signal substantially to zero, (i) the other cutter having means arranged to receive the electrical signal representative of the desired depth of cut by that cutter, the electrical signal representative of the thickness of the workpiece after it has been acted upon by that cutter and the signal representative of the thickness of the workpiece after it has been acted upon by the first encountered cutter and to produce a second error signal representative of the difference between the desired and actual depth of cut of said other cutter, and (j) means responsive to said second error signal to operate said other cutter positioning means in the sense to reduce said second error signal substantially to zero to thereby produce the desired depth of cut on each face of the workpiece irrespective of variations in the thickness of the workpiece upstream of both cutters.

4. A milling machine as claimed in claim 3, characterised in that the signal representative of the thickness of the workpiece after it has been acted upon by the first cutter is delayed for a period of time determined by the speed of movement of the workpiece along the path before being compared with said addition signal.

5. A milling machine as claimed in claim 4, characterised in that the addition signal is modified by a further signal representative of a change in diameter of the second cutter from a predetermined value 6. A milling machine as claimed in claim 3, characterised in that the signal representative of the thickness of the workpiece after it has been acted upon by the first cutter is sampled by the control means at regular intervals and is held at the sampled value until the next sample is taken.

7. A milling machine as claimed in any in claim 3 and in which each cutter has a co-operating support member in the form of a back-up roller associated therewith, the roller being positioned on the opposite side of the path to the cutter, characterised in that the relative positional movement is brought about by keeping the roller fixed and moving its associated cutter.

8. A milling machine as claimed in claim 1 or 3, characterised in that the signal representative of the thickness of the workpiece upstream of the cutter is delayed by a period of time determined by the speed of movement of the workpiece along the path before being compared with said other signals.

9. A milling machine as claimed in claim 1 or 3, characterised in that the error signal is modified by a further signal representative of a change in diameter of the cutter from a predetermined value.

10. A milling machine as claimed in claim 1 or 3 claim, characterised in that the signal representative of the thickness of the workpiece upstream of the cutters is sampled by the control means at regular intervals and is held at sampled value until the next sample is taken.

* * * * *